Figure 1:
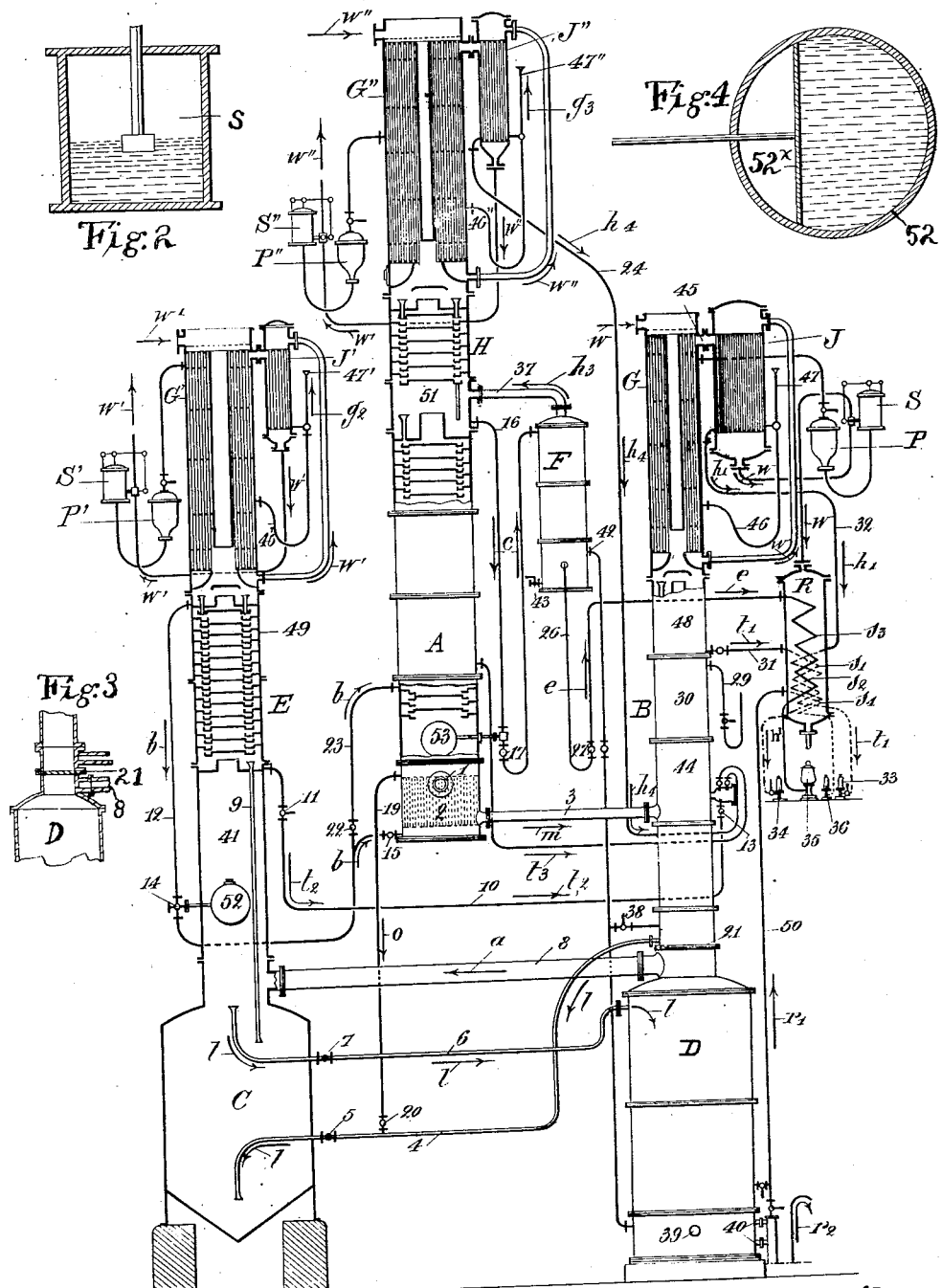

No. 887,793. PATENTED MAY 19, 1908.
E. GUILLAUME.
RECTIFYING OF ALCOHOLIC LIQUID.
APPLICATION FILED DEC. 9, 1902.

Witnesses
Inventor
Emile Guillaume

UNITED STATES PATENT OFFICE.

EMILE GUILLAUME, OF PARIS, FRANCE.

RECTIFYING OF ALCOHOLIC LIQUID.

No. 887,793.  Specification of Letters Patent.  Patented May 19, 1908.

Application filed December 9, 1902. Serial No. 134,504.

*To all whom it may concern:*

Be it known that I, EMILE GUILLAUME, a citizen of the French Republic, residing at Paris, in the Republic of France, engineer, (whose full postal address is 18 Rue Mogador, Paris aforesaid,) have invented certain new and useful Improvements in Rectifying of Alcoholic Liquid, (for which I have obtained a patent in France, No. 321,871, bearing date June 7, 1902,) of which the following is a specification.

This invention relates to processes of distillation and consists in a systematic and continuous method of fractionating composite vapors containing a number of components of varying volatility by taking advantage of differences in boiling point and in vapor tension, enabling the production in one operation of high-grade pure alcohol and high-grade by-products from crude alcoholic vapors; all as more fully hereinafter set forth, matters of novelty being particularly pointed out in the appended claims.

Crude alcoholic vapors, such as those arising from the direct distillation of wine, beer, etc., in addition to the ethyl alcohol and water which are their main constituents, contain a number of other bodies, partly, like aldehyde and certain esters, of a lower boiling point than alcohol, and partly of a higher boiling point, like the bodies forming fusel oil, and a number of other esters. Many of these latter esters have a high vapor tension, and, under the ordinary laws controlling the volatilization of mixed fluids, it is difficult to separate them completely from the alcohol in crude weak spirit by ordinary methods used with ordinary column stills, such methods operating principally upon differences in the boiling points. These methods therefore do not deliver a high grade alcohol, such as is wanted in the trade, in one operation, the product requiring a separate rectification or treatment. Unfortunately it often happens in such rectification that new impurities are formed to some extent by the oxidation of alcohol to aldehyde, to acids forming new esters, etc.

It is the object of the present invention to provide a method in which pure high grade alcohol and high grade by-products are directly prepared and to do this with economy in the heating agent. For this purpose, advantage is taken of the varying relations of the impurities named to alcohol of different strengths.

In the preferred mode of carrying out the present process, weak alcoholic vapors arising from any common still are introduced into the heating chamber of a rectifying still (whose purpose will later appear) where they impart their heat to the contents of this still, and become more or less condensed. The condensate and uncondensed vapors are withdrawn from the chamber and introduced into a purifying still where their strength is reduced somewhat with water and where the bulk of the impurities are removed. Preferably the strength is reduced to about 16 to 17 B. (30 to 33 per cent. of alcohol by weight). At this dilution, aldehyde, amyl alcohol, the various esters, etc., can be distilled away from the alcohol without any great amount of alcohol distilling. This is because the amyl alcohol, the esters, etc., have comparatively little affinity for, or solubility in, water and are much less affected in the matter of vapor tension than is the alcohol; this being particularly true of the mixed esters whose removal is ordinarily difficult. Advantage is taken of this fact by distilling said weak alcohol in a column still maintained under particular conditions. The still is heated at the base in the ordinary manner, either by the direct introduction of free steam or by the use of a steam coil, the former being preferred. The feed however is not at the top or base, as is customary, but at a point well above the latter. Interiorly the column is provided with the usual cups and plates. At a point above the feed, water is introduced in limited amounts to pass down the column against ascending vapors. Since water, as already stated, does not interfere materially with the vapor tension of the constituents other than alcohol, it is obvious that in operating in this manner, the said other constituents will tend to pass up the column past the water inlet while the alcohol will not. Above the water inlet, there is a draw off pipe communicating with the fluid space of one of the fractionating devices, while above this again the column extends to some distance. The high boiling products in the vapor passing the water inlet are fractionated out and are partially removed by this draw off. The part which is removed by the said draw off contains the bodies constituting ordinary amyl alcohol and in addition a number of esters like isovalerate of isoamyl, ethyl acetate, isovalerate of ethyl, ethyl isobutyrate, etc., which are more difficult of removal from alcohol than is amyl alcohol because of their high vapor tension, in ordinary fractionation and concentration of alcohol but which here will separate readily because of the exceedingly dilute state of the alcohol in the column. The said part is condensed above the water inlet, because in this region of the column the diluted state of the products diminishes progressively, and the bodies which constitute the said part, are removed in a liquid state. The vapors which reach the top of the column in the purifying still consist mainly of aldehyde and such extremely low boiling products. They are condensed by a special arrangement and recovered. The strength of the alcohol in this purifying operation is advantageously about 16° to 17° B., say 30 to 33 per cent. by weight, as with this strength the described separation proceeds easily.

In the above described operation, it will be seen that weak alcohol is purified by removing both low boiling impurities of the nature of aldehyde and high-vapor tension, high boiling bodies like fusel oil and esters. The hot weak, purified alcohol resulting from this is next introduced into a large body of comparatively highly heated water in communication with a second or alcohol still where its volatile constituents, now mainly alcohol, are boiled off. The vapors ascend through another column and are refractionated, the alcohol being removed from the top of the column, either as vapor or liquid, and such amyl alcohol, etc., as was not removed from it in the purifying still, being removed at the base of the column and returned to said purifying still. The alcohol delivered is preferably of a strength between 38 and 39 Baumé, or 86 to 88 per cent. by weight as permitting a good elimination of fusel oil and as being of a boiling point allowing the heat of the original crude alcoholic vapors to maintain it in ebulition. The alcohol so obtained is introduced into the base of a rectifying still and here rectified to commercial strength of 43 to 44 B., or 95 to 96 per cent. Any traces of amyl alcohol which may have passed to this point are removed from the base of the still, while aldehydes and low boiling esters are removed by means of a chilling condenser surmounting the rectifying column above the outlet of condensed rectified alcohol. As already stated some new aldehyde and esters are extremely likely to be formed in this rectification. Therefore to insure perfect purity in the delivered concentrated alcohol after leaving the rectifying column, it is submitted to still another treatment to remove low boiling impurities which are returned to the rectifying still.

Both the low boiling and the high boiling impurities separated in the rectifying column are returned to the purifying still for treatment afresh.

In the accompanying more or less diagrammatic illustration is shown one type of apparatus of the many adapted to perform the above described process; Figure 1 representing the apparatus as a whole, and Figs. 2, 3, and 4 are sectional views of details.

In this illustration, A indicates the rectifying still as a whole, B the purifying still and E the alcohol still. It is to be understood that these names are merely chosen for convenience of description.

Crude alcoholic vapors from a wine or beer still (not shown) enter through inlet 1 into the heating chamber 2 in the base of the rectifying still A, serving to furnish the necessary heat for operating said still. Pipe 3 serves to withdraw from this chamber both condensate and uncondensed vapors and introduce them into purifying still B, arrow, $m$, showing the direction of the flow. The introduction is made at a point well above the base of the still, shown at 21. For the sake of convenience, as shown, the purifying still B is mounted on a column D whose functions will be later described but it has no direct connection therewith, base plate 21 being imperforate, as shown in Fig. 2. At the point where the condensate etc., enter the average composition of the liquid in the plates of the column will be the same as the incoming feed. Near 21 a steam pipe 38 furnishes the heat required for the operation of the column and also some aqueous vapor. Passing downward, the condensates are gradually freed of their aldehyde and high tension impurities and emerge through pipe 4, just below the steam inlet in a purified condition. Arrows 1, show the direction of the flow. Flowing upward from the feed inlet the vapors pass successively through several sections of the column lettered 44, 30 and 48, in their course passing a downflowing current of weak condensate, concentration as regards alcohol being avoided by water furnished through pipe 29. It is obvious that this water being furnished at a point only where alcohol would naturally tend to accumulate may therefore be less in amount than if supplied at a lower point. In effect, I thereby get the advantage of distilling from an excessively weak alcohol without being obliged to actually dilute the whole mass to such an extent. In the plates of the column above the water inlet, the fractionation of the alcohol free vapors is effected, the condensed high boiling high vapor tension bodies being withdrawn by pipe 31, communicating with the plates of the column immediately above the water inlet, sent through a worm $s^1$ in a refrigerator R, arrow $t^1$ showing the direction of the flow, and ultimately passing out of the system through testing and withdrawing apparatus 33. The low boiling bodies like aldehyde, which are not condensed with the amyl alcohol, esters, etc., pass upward through a plate column and enter a condensing apparatus G where any residual high boiling bodies are removed and passed back into the still. From G the vapors enter condenser J through 45, leaving it through pipe 32 in the direction indicated by arrow $h'$ and are sent through a worm $s^2$ in the refrigerator R, finally leaving the apparatus through efflux and testing device 34. Cooling fluid is supplied to G and J as shown by arrow $w$, and flows downward through the pipes shown, thence upward, as shown by $w$, past a valve controlled by S and P and down through R to exit. Variations in pressure in still head G are communicated to P and act upon a body of water or other fluid (not shown) in its base and communicating with cylinder S which is provided with a suitable float or other device (not shown) to operate the valve for controlling the flow of cooling fluid. Valved pipe 47 offers an exit for uncondensible gases in J and G. G may be tapped by pipe 46 at any convenient point above its base, but J is preferably tapped near its base to enable optional removal of condensed liquid through 47.

In G and J the vapors surround the cooling pipes shown.

The purified weak alcohol from the purifying still B leaves through 4, the flow being controlled by valve 5 and enters a mass of liquid contained in tank C, which has for its purpose to maintain constant the strength of the alcoholic liquid which is delivered through pipe 6 as shown by arrow 1 and the separate column D, the working of the said tank C being described in my United States Patent #778450; the flow is controlled by valve 7. In D it is treated by steam entering through inlet 39 and the evolved vapors are led back into the top of C through pipe 8 as indicated by arrow $a$. Waste liquid free of alcohol is removed from D through 40 as indicated by arrow $r^2$ a branch pipe 50 allowing a portion to be taken, as indicated by arrow $r^1$ through worm $s^4$ in refrigerator R to testing device 36.

Tank C communicates through open column 41 with alcohol column E. In E fractionation is performed in the ordinary way by plates 49, any residual amyl alcohol etc. being removed by pipe 10, as indicated by arrows $t^2$, and returned to the purifying column B, the flow being controlled by valves 11, and 13. The alcohol which accumulates in the top plates of the column is removed through pipes 12 and 23 and sent, as shown by arrows $b$, to the rectifying column A. Flow is controlled by valves 14, 15 and 22. 14 is actuated by a control mechanism 52 located in open column 41, 52 being a chamber having a diaphragm $52^{\times}$ therein which is connected to the valve 14. The chamber contains a volatile liquid or a vapor whose expansion and contraction with changes in temperature will actuate the diaphragm and so operate valve 14. 22 and 15 allow, respectively, the alcohol to be directed into the lower plates of the column A or below the heating chamber 2 as may be desired.

Above the column E and in open communication therewith are condensing devices G' and J', in most respects like G and J already described, the flow of cooling fluid being indicated by $w'$, controlled by S' and P', etc. 46' and 47' afford a valved outlet for removal of uncondensable gases and anything which may occasionally condense in J', as indicated by arrow $g^2$. Any alcohol not condensed in the plate column is condensed in G' and returned to the upper plate of E.

The alcohol from E sent to A by pipes 12 and 23, should be of a density about 38 to 39 B., or 86 to 88 per cent. by weight. Spirit of this concentration is readily boiled by the original crude alcoholic vapors in the steam chamber, 2, of rectifying column A. Rectification proceeds on the cups and plates as usual, and whatever fusel oil still remains accumulates in the lower plates of the series above the alcohol inlet and is removed and returned to the purifying still, B, for treatment anew, as is indicated by arrow $t^3$. Rectified alcohol is removed from the column at a relatively high point by means of pipe 16, the flow, and consequently the richness, being controlled by the usual means 53, operating on valve 17. Any alcohol vapors rising above the outlet, through 16, into space 51 and secondary plate column H are condensed and returned. Surmounting H and in open connection therewith is an accessory condenser G'', substantially like G and G', already described, cooling fluid flowing through it as shown by $w''$ and being controlled by S'' and P''.

Some aldehyde and esters are formed in this rectification, however, as has already been stated, and it is desirable to recover these. For this purpose from J'', which is substantially like J and J', the condensate of the vapors escaping from G'' is removed by pipe 24, as is shown by arrows $h^4$, and is sent to the purifying column B for treatment therein. By reason of the formation of these bodies the rectified alcohol drawn from rectifying still A is still not quite as pure as is desirable. It is therefore further treated in F, which is a short column still of the ordinary type, being passed downward against the heat from a heating chamber in the base, supplied with heating agent through 42 and having an exhaust at 43. Volatilized low boiling bodies, together with considerable alcohol, leave F through pipe 37, as indicated by arrow $h^3$, and are returned to the suppelmentary column H above A for treatment. Their alcohol rejoins that in the column below while aldehyde, etc pass upward into J''.

The treated, now very pure, alcohol leaves F through pipe 26, provided with valve 27, passes through worm $s^3$ in refrigerator R and ultimately leaves the system through 35.

In condensers G'' and J'', valved outlets 46'' and 47''' afford exit for uncondensable gases, as indicated by arrow $q^3$.

In case the foots in rectifying column A run low in alcohol, as will happen when alcohol is introduced to the plate column through 23 instead of below or around the heating chamber through 22, they may be returned to tank C through pipe 19, valved at 20, as indicated by arrow $o$.

What I claim is:

1. The process of preparing high grade alcohol and by-products which consists in distilling weak alcohol in a column still against a descending current of water, fractionating and concentrating the volatile by-products in the still above the point of water inlet, and removing the alcohol below said point.

2. The process of preparing high grade alcohol and by-products which consists in distilling alcohol of a strength of about 30 per cent. by weight in a column still against a descending current of water, fractionating and concentrating the volatile by-products in the still above the point of water inlet, and removing the alcohol below said point.

3. The process of preparing pure alcohol which consists in boiling off volatile impurities from weak alcohol in a column still and passing the evolved vapors against a descending stream of water to prevent elimination of alcohol, removing the purified alcohol below the point of water inlet and separating residual fusel oil from the same in a second still arranged to deliver moderately concentrated alcohol, and finally concentrating and rectifying said alcohol in a rectifying still.

4. The process of preparing pure alcohol which consists in boiling off impurities in a column still and passing the evolved vapors against a descending stream of water to prevent elimination of alcohol, removing the purified alcohol below the point of water inlet and separating residual fusel oil from the same in a second still arranged to deliver moderately concentrated alcohol, concentrating and rectifying said alcohol, and eliminating low-boiling impurities therefrom.

5. The process of preparing pure alcohol which consists in boiling off impurities from weak alcohol in a column still and passing the evolved vapors against a descending stream of water to prevent elimination of alcohol, removing the purified weak alcohol and separating residual fusel oil from the same in a second still arranged to deliver moderately concentrated alcohol, and finally concentrating and rectifying said alcohol in a rectifying still.

6. The process of preparing pure alcohol which consists in boiling off impurities from weak alcohol in a column still and passing the evolved vapors against a descending stream of water to prevent elimination of alcohol, removing the purified weak alcohol and separating residual fusel oil from the same in a second still arranged to deliver moderately concentrated alcohol, concentrating and rectifying said alcohol, and eliminating low boiling impurities therefrom.

7. The process of preparing pure alcohol which consists in boiling off impurities from weak alcohol of a strength of about 30 per cent. by weight in a column still and passing the evolved vapors against a descending stream of water to prevent elimination of the alcohol, removing the purified weak alcohol and separating residual fusel oil from the same in a second still arranged to deliver moderately concentrated alcohol, and finally concentrating and rectifying said alcohol in a rectifying still.

8. The process of preparing pure alcohol which consists in boiling off impurities from weak alcohol of a strength of about 30 per cent. by weight in a column still and passing the evolved vapors against a descending stream of water to prevent elimination of alcohol, removing the purified weak alcohol and separating the residual fusel oil from the same in a second still arranged to deliver moderately concentrated alcohol, concentrating and rectifying said alcohol, and eliminating low boiling impurities therefrom.

9. The process of preparing pure alcohol from weak alcoholic vapors which consists in passing said vapors through the heating chamber of a rectifying still, introducing the efflux product from the chamber into a purifying still, therein boiling off impurities while retaining alcohol in solution, concentrating the alcohol from said purifying still in a second still and eliminating residual fusel oil, and rectifying said concentrated alcohol in the rectifying still by the heat of the original weak alcoholic vapors.

10. The process of preparing pure alcohol from weak alcoholic vapors which consists in passing said vapors through the heating chamber of a rectifying still, introducing the efflux product from the chamber into a purifying still, therein boiling off impurities while retaining alcohol in solution, concentrating the alcohol from said purifying still in a second still and eliminating residual fusel oil, rectifying said concentrated alcohol in the rectifying still by the heat of the original weak alcoholic vapors, and finally eliminating low boiling impurities from the rectified alcohol.

11. The process of preparing pure alcohol from weak alcoholic vapors which consist in passing said vapors through the heating chamber of a rectifying still, introducing the efflux product from the chamber into a purifying still, therein boiling off impurities while retaining alcohol in solution, concentrating the alcohol from said purifying still in a second still and returning tail products to the purifying still, rectifying the concentrated alcohol from the second still in said rectifying still by the heat of the original weak alcoholic vapors, returning eliminated high and low boiling impurities to the purifying still, and withdrawing the rectified alcohol.

12. The process of preparing pure alcohol from weak alcoholic vapors which consists in passing said vapors through the heating chamber of a rectifying still, introducing the efflux product from the chamber into a purifying still, therein boiling off impurities while retaining the alcohol in solution, concentrating the alcohol from said purifying still in a second still and returning tail products to the purifying still, rectifying the concentrated alcohol from the second still in said rectifying still by the heat of the original weak alcoholic vapors, returning eliminated high and low boiling impurities to the purifying still, withdrawing the rectified alcohol and eliminating low boiling impurities there from.

13. The process of purifying alcohol which consists in introducing the same in diluted form into a column still at a point well above the bottom, introducing heating vapors into the bottom portion of the still, introducing a descending stream of water at a point above the alcohol inlet, removing high boiling impurities from the still at a point above the water inlet, removing low boiling impurities at a point still further above the same, and finally removing the alcohol, still in the diluted form, from the bottom of the still.

14. The process of preparing pure alcohol which consists in rectifying alcohol in a rectifying column, removing and re-rectifying the alcohol therefrom, returning evolved vapors to the original rectifying column, and removing the re-rectified alcohol.

15. The process of preparing pure alcohol and byproducts which consists in distilling off volatile impurities from weak alcohol in a column still and passing the evolved vapors past a descending stream of water in said still to prevent elimination of alcohol, removing the purified alcohol from the base of the still, removing high-boiling high-vapor tension impurities from a point in the column immediately above the point of water inlet and separating and removing low boiling impurities from a point above the outlet for said high-boiling impurities.

16. The process of preparing pure alcohol and by-products which consists in distilling off volatile impurities from weak alcohol of a strength of about 30 per cent. by weight in a column still and passing the evolved vapors past a descending stream of water in said still to prevent elimination of alcohol, removing the purified alcohol from the base of the still, removing high-boiling high-vapor tension impurities from a point in the column immediately above the point of water inlet and separately removing low boiling impurities from a point above the outlet for said high-boiling impurities.

17. The process of preparing pure alcohol and by-products which consists in distilling off volatile impurities from weak alcohol in a column still and passing the evolved vapors past a descending stream of water to prevent elimination of alcohol, removing the eliminated impurities to a place of storage, removing the purified alcohol, further purifying and concentrating it, and restoring the newly eliminated impurities to the original still.

18. The process of preparing pure alcohol which consists in distilling away volatile impurities from weak alcohol of a strength of about 30 per cent. by weight, concentrating the alcohol, distilling it away from less volatile impurities in a concentrated state, and finally rectifying it to high concentration.

19. The process of preparing pure alcohol which consists in distilling away volatile impurities from weak alcohol of a strength of about 30 per cent. by weight, concentrating it to about 86 per cent. by weight and simultaneously distilling it away from less volatile impurities, and finally rectifying to about 95 per cent.

20. The process of preparing pure alcohol and by-products which consists in eliminating volatile impurities from weak alcohol in a column still, separately collecting low and high boiling impurities, removing the purified alcohol and further purifying the same in a concentrated state, and returning the eliminated impurities to the original still.

21. In the art of alcohol manufacture, the process which consists in passing the vapors of weak alcohol into the heating chambers of a rectifying still, whereby the rectifying still is heated and the said vapors condensed, removing impurities from the weak alcohol, concentrating the weak alcohol, and passing the concentrated alcohol into said rectifying still to be rectified by the heat of such vapors.

22. In the art of alcohol manufacture, the process which consists in purifying weak alcohol, concentrating the weak alcohol in a column still, passing the concentrated alcohol into a rectifying column still at a point above its base, removing fusel oil for further treatment from a point in the column not far above the alcohol inlet, removing the rectified alcohol from a point in the column above the fusel oil outlet and below the top of the column, and removing very volatile impurities from the top of the column for condensation.

23. In the art of alcohol manufacture, the process which consists in purifying the alcohol in a weak state, purifying this in a concentrated state, rectifying the alcohol in a column still, removing the rectified alcohol from a point below the top of the column, re-rectifying the alcohol to remove aldehyde and other volatile impurities and passing such removed vapors back into the rectifying still above the alcohol outlet but below the top of the still, and finally eliminating aldehyde from the top of the still.

In witness whereof I have hereunto set my hand in presence of two witnesses.

EMILE GUILLAUME.

Witnesses:
 JULES FAYOLLET,
 AUGUSTUS E. INGRAM.